United States Patent
Galat

[15] 3,694,503
[45] Sept. 26, 1972

[54] DIFFERENTIAL HERBICIDAL ACID ANHYDRIDES OF IMIDIC ACIDS AND LOWER ALKANOIC ACIDS
[72] Inventor: Alexander Galat, 1980 South Ocean Drive, Hallandale, Fla. 33009
[22] Filed: March 1, 1971
[21] Appl. No.: 119,848

[52] U.S. Cl.....................260/545 R, 71/76, 71/115, 260/562
[51] Int. Cl............................................C07c 119/00
[58] Field of Search........................260/490, 545 R

[56] References Cited

UNITED STATES PATENTS 2,573,673  10/1951  Ritter.....................260/545 R
3,625,990  12/1971  Noguchi et al.........260/545 R Primary Examiner—Vivian Garner
Attorney—Robert F. Ruthruff

[57] ABSTRACT

1-Acyloxy 1-(halophenyl)-imino) alkanes, such as 1-propionyloxy 1-((3',4'-dichlorophenyl)-imino) propane, exhibit a strong differential herbicidal effect. While these compounds exhibit an extremely low to zero phytotoxic action when applied to the rice plant, at the same application rate these compounds result in a complete kill of a wide variety of other species of plants commonly found in rice fields as weeds.

5 Claims, No Drawings

DIFFERENTIAL HERBICIDAL ACID ANHYDRIDES OF IMIDIC ACIDS AND LOWER ALKANOIC ACIDS

This invention describes and claims certain new and novel imino esters exhibiting valuable differential herbicidal properties.

More particularly, this invention relates to certain new and novel imino esters exhibiting a high solubility in inexpensive and readily available aromatic hydrocarbon solvents.

In certain specific aspects thereof this invention embraces imino esters having the generic structural formula:

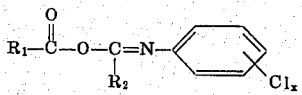

Where $R_1$ and $R_2$ are lower alkyl radicals and X is zero or a whole number in the range 1 to 5.

Compounds coming within the purview of this invention include 1-acyloxy 1-((chlorophenyl)-imino) alkanes such as the following:

1-Propionyloxy 1-((3',4'-dichlorophenyl)-imino) propane. (Here $R_1$ and $R_2$ are ethyl radicals and X is 2). Simply as a matter of convenience this compound is frequently designated "PP" herein (propionyl — propane).

1-Acetyloxy 1-((3'4'-dichlorophenyl)-imino) propane. (Here $R_1$ is the methyl radical and $R_2$ is the ethyl radical). As a matter of convenience this compound is, on occasion, designated "AP" herein (acetyl — propane).

1-Acetyloxy 1-((3',4'-dichlorophenyl)-imino) ethane. (Here both $R_1$ and $R_2$ are methyl radicals and X is 2 as in the previous compounds.) As a matter of convenience is now and then designated "AE" herein (acetyl — ethane).

1-Propionyloxy 1-((3',4'-dichlorophenyl)-imino) ethane. (In this compound $R_1$ is the ethyl radical, $R_2$ is the methyl radical and, as usual, X is 2.) As a matter of convenience, this compound, on occasion, is designated "PE" herein (propionyl — ethane).

As will appear subsequently, 1-propionyloxy 1-((3',4'-dichlorophenyl)-imino) propane appears to be the preferred compound of the four compounds above named. This compound combines the highest phytotoxic effect on a wide variety of plants (many of which are present as weeds in rice fields) with an absence of phytotoxicity against the rice plant. Accordingly, the present invention will be described largely in connection with the preparation, chemical and physical properties and differential herbicidal action of this preferred compound.

In general, the compounds of this invention are prepared by reacting arylamines or anilides with acylating agents such as acid anhydrides, acid chlorides, ketenes and the like. The following example sets forth a typical synthesis of 1-propionyloxy 1-((3'4'-dichlorophenyl)-imino) propane (PP), the preferred compound of this invention.

EXAMPLE 1

One hundred and sixty two grams (1 mole) of 3,4-dichloroaniline and 162 g. (2.2 moles) of propionic acid were kept at the boiling point, the water of reaction being allowed to escape by distillation in the form of the water-propionic acid azeotrope. When the theoretical amount of water had been removed, remaining excess propionic acid was removed by distillation and the residue was treated with 450 g. propionic anhydride. The resulting mixture was brought to 160° C. and maintained at this temperature for 10 hours following which the desired imino ester was separated from the crude reaction mixture by vacuum distillation. B.P., 160°–165° C. at about 5 mm. mercury pressure.

Analysis: Calculated for $C_{12}H_{13}Cl_2NO_2$:
            C, 52.7%   H, 4.74%;   Cl, 25.90%   N, 5.11%
Found:   C, 53.1%   H, 4.54%;   Cl, 25.70%;   N, 5.27%.

1-Propionyloxy 1-((3',4'-dichlorophenyl)-imino) propane is a white, crystalline substance melting at 50°–53 C.

While insoluble in water, the compound exhibits an extremely high solubility in inexpensive, common, organic solvents such as xylene, readily dissolving in half its own weight of xylene.

In the presence of mild alkali PP is hydrolyzed to form 3, 4-dichloropropionanilide while in strong alkali hydrolysis to 3,4-dichloroaniline occurs.

As will be apparent to those skilled in the chemical art, by suitable selection of reactants any of the other imino esters set forth previously herein may be obtained by following the general preparative procedure set forth in the example.

In the initial step of the two step preparative reaction described in the example, aniline or the aniline derivative reacts with the organic acid to form an equilibrium mixture of the two tautomeric compounds:

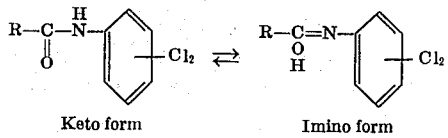

Keto form                Imino form

In the second step of the two step reaction, the above tautomeric mixture is treated with an acid anhydride, the acid anhydride reacting with the free hydroxyl group of the imino form of the tautomeric pair to produce an imino ester of this invention. As is well known to those skilled in the chemical art, this removal of the imino form of the tautomeric pair through ester formation upsets the equilibrium between the two tautomers so an additional quantity of the keto form changes to the imino form in order to reestablish the equilibrium and this new supply of imino form tautomer reacts with the acid anhydride as already described.

As will be evident, in the two step reaction of this synthetic procedure, if either acetic acid or propionic acid is used in the first step and either acetic anhydride or propionic anhydride is employed in the second reaction step, this furnishes four different pairs of reactants and results in the four different 1-acyloxy 1-((3',4'-dichlorophenyl)-imino) alkanes specifically named previously herein. It may be mentioned as a matter of interest that 1-acetyloxy 1-((3', 4'-dichlorophenyl)-imino) propane (AP) melts at 70°–75° C. (unsharp); 1-acetyloxy 1((3',4'-dichlorophenyl)-imino) ethane melts at 80°–85° C. (unsharp).

EXAMPLE 2

This example describes a modified synthetic procedure which is more reproducible, more practical and gives somewhat higher yields than that described in Example 1. In this modified procedure, 100 g. 3,4-dichloropropionanilide are dissolved in 375 ml. toluene and the solution was treated with 10.5 g. finely divided sodium at 100° C, while stirring under reflux. After all the sodium had reacted, the temperature of the reaction mixture was reduced to 0°–5° C. and 42.5 g. propionyl chloride dissolved in 125 ml. toluene were added gradually with continuous stirring. The temperature was then raised to 80° C. and the sodium chloride precipitate was removed by filtration and washed with hot toluene. The combined filtrate and washings were evaporated to dryness under vacuum, heating under vacuum being continued until constant weight was obtained. The resulting PP weighed 100 g.

As will be evident to those skilled in the art, by obvious modifications of certain of the reactants employed in the above synthetic process any one of the four different 1-acyloxy 1-((3',4'-dichlorophenyl)-imino)alkanes specifically named previously herein may be produced. Thus, in example 2, acetyl chloride may replace the propionyl chloride of the example to give 1-propionyloxy 1-((3',4'-dichlorophenyl)-imino)ethane. Similarly, by substituting 3,4-dichloroacetanilide for the 3,4-dichloropropionanilide of Example 2, and by using, respectively, propionyl chloride and acetyl chloride to react with the sodium salt of the imino form of the tautomeric pair, produces, respectively, 1-acetyloxy 1-((3',4'-dichlorophenyl)-imino)propane and 1-acetyloxy 1-((3',4'-dichlorophenyl)-imino) ethane.

Within experimental limits the 1-propionyloxy 1-((3',,4'-dichlorophenyl)imino) propane of Example 2 exhibits the same physical and analytical properties as that obtained via Example 1.

Data on the herbicidal action of several of the compounds of this invention on a wide variety of plant species are presented in the following table.

The plants employed in the tests to be described were rice, oats, cucumbers, tomatoes, barnyard grass (Echenochloa crusgalli), pigweed (Chenopodium album) and setaria. The test plants were raised in individual pots. A staggard date of planting was employed with the several test species so that all plants would be at approximately the same stage of growth at the time of application of the compounds of this invention. (Most of the species used here germinate, emerge and grow at approximately the same rate but tomato plants particularly are relatively "slow starters" and accordingly tomato seeds had to be planted considerably earlier than seeds of the other species.)

The pots containing the test plants were placed on a moving belt and spray was applied to them from a stationary nozzle positioned above the moving belt. A spray pressure of 40 pounds per square inch was employed and the rate of application of spray was equivalent to 40 gallons per acre.

Emulsifiable, concentrated hydrocarbon solvent solutions of several of the differential herbicides of the present invention were emulsified in water to produce three dilute test solutions which, when applied at the above mentioned constant application rate of 40 gallons per acre, resulted in the application of the equivalent of 4, 2 and 1 pounds per acre respectively of the particular differential herbicide under test.

Simultaneous, complementary tests were conducted as above described employing 3, 4-dichloropropionanilide as the differential herbicide. This material was obtained as a commercial emulsifiable solution containing 35 percent by weight of the herbicide and 65 percent solvent plus emulsifying agent. It was emulsified in water to form three solutions of the concentrations set forth in the previous paragraph, that is, 0.1, 0.05 and 0.025 pounds herbicide per gallon so when sprayed at an application rate of 40 gallons per acre the herbicide is applied at rates of 4, 2 and 1 pounds per acre respectively.

Three replicated pots of each plant species were used for each individual differential herbicide tested and for each dosage rate employed.

After spraying, the plants were observed over a considerable period of time and the results of the application of spray were evaluated on an arbitrary scale according to which 0 indicates the plants were not affected while increasing integers indicate an increasing degree of plant injury to a maximum of 10 which indicates the plants were killed by the particular treatment they received.

The results of these spray tests are summarized in the following table:

TABLE

Post Emergence Differential Herbicidal Evaluation

| differential herbicide | rate lbs./AC. | pig weed | barn yard grass | set- aria | rice | oats | cucum- ber | toma- to |
|---|---|---|---|---|---|---|---|---|
| PP* | 4 | 10 | 10 | 10 | 1–TB | 9 | 10 | 7 |
|  | 2 | 10 | 9 | 9 | 0 | 5 | 9 | 4 |
|  | 1 | 10 | 9 | 8 | 0 | 2 | 8 | 0 |
| PP* (Repeat) | 4 | 10 | 10 | 10 | 0 | 10 | 10 | 9 |
|  | 2 | 9 | 9 | 10 | 0 | 6 | 10 | 5 |
|  | 1 | 7 | 5 | 7 | 0 | 3 | 7 | 0 |
| AE* | 4 | 10 | 7 | 4 | 0 | 5 | 2–I | 1–Y |
|  | 2 | 8 | 4 | 2 | 0 | 2 | 0 | 0 |
|  | 1 | 4 | 1 | 0 | 0 | 1 | 0 | 0 |
| AP* | 4 | 10 | 10 | 10 | 3 | 6 | 10 | 5 |
|  | 2 | 10 | 10 | 9 | 0 | 3 | 9 | 3 |
|  | 1 | 10 | 9 | 7 | 0 | 0 | 6 | 0 |
| 3,4-Dichloro propionanilide | 4 | 10 | 10 | 10 | 2–I | 9 | 10 | 10 |
|  | 2 | 10 | 10 | 10 | 1–I | 6 | 10 | 5 |
|  | 1 | 10 | 3 | 3 | 0 | 2 | 10 | 1 |
| None | – | 0 | 0 | 0 | 0 | 0 | 0 | 0 |

*PP, AE, AP. For identity of compounds designated thus, see text.
TB = tip burn
I = growth inhibited
Y = yellowing In the Table the first two vertical columns set forth, respectively, the identity of the differential herbicide under test and the rate of application thereof in pounds per acre. The remaining seven vertical colums are headed by the same name of the plant species being tested followed by an evaluation of the effect (expressed in accordance with the arbitrary evaluation scale previously described in detail herein) of application of the several differential herbicides on the named plant species at each of the three rates of application used.

As will be seen from the data presented there is a gross similarity in activity of all the differential herbicides tested. The rice plant exhibited a remarkably high degree of tolerance with respect to all of the chemicals applied while, in general, all these differential herbicides exhibited a high degree of activity against all other plant species under test. However, compound AE not only is without action on rice plants but also does not have any great effect on cucumber and tomato plants. Incidentally, the tolerance of the tomato plant (generally considered to be a very sensitive plant with respect to herbicides) in the experiments presented here, especially at low application rates, is quite remarkable.

On the basis of the data presented it appears that of the differential herbicides of the present invention under test, compound PP combines greatest safety to the rice plant with the highest activity against the other plant species tested.

It will be noted that 3,4-dichloropropionanilide is generally quite similar in action to PP in that rice is relatively tolerant thereto while this anilide shows a good kill with respect to the other plant species tested, especially at the high and intermediate rates of application. 3,4-Dichloropropionanilide appears to have a small inhibitory effect on the growth of the rice plant at the high and intermediate rates of application but a much more extensive testing program with this differential herbicide would be necessary before a definite statement could be made.

However, 3,4-dichloropropionanilide exhibits a quite definite disadvantage is comparison with the differential herbicides of this invention, this disadvantage being the low solubility of the compound in inexpensive, common organic solvents and disadvantages corollary thereto.

As mentioned previously herein, compound PP (as well as the other differential herbicides of this invention) readily dissolves in half its own weight of xylene, a readily available and inexpensive solvent.

In contrast, the solubility of 3,4-dichloropropionanilide in xylene is only about 5 percent, a figure much too low for practical use. Thus, the pumping, drumming, container costs, storage costs (both at the point of manufacture and in the vicinity of areas of use), transportation, etcetera of such dilute solutions makes the use thereof economically prohibitive.

In order to overcome the disadvantages flowing from the low solubility of 3,4-dichloropropionanilide in inexpensive organic solvents resort has been had to expensive but extremely powerful solvents such as methyl isobutyl ketone, isophorone, and the like, these expensive, powerful solvents frequently being diluted with more or less of the readily available, inexpensive solvent such as xylene. A commonly used solvent mixture for 3,4-dichloroprioionanilide is isophorone and xylene in equal volumes. However, even with such powerful solvents and solvent mixtures it is not practical to prepare a solution of 3,4-dichloropropionanilide containing more than three pounds per gallon of this differential herbicide. This low solubility, even in powerful and expensive solvents is in distinct contrast to the extremely high solubility of the differential herbicides of this invention in inexpensive and readily available organic solvents.

Be it remembered that while this invention has been described in connection with specific details and specific embodiments thereof, these details and embodiments are illustrative only and are not to be considered limitations on the spirit and scope of said invention except in so far as these may be incorporated in the appended claims.

I claim:

1. Compounds of the formula:

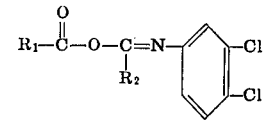

wherein $R_1$ and $R_2$ are alkyl radicals selected from the group consisting of the methyl radical and ethyl radical.

2. The compound of claim 1 in which $R_1$ and $R_2$ are ethyl radicals.

3. The compound of claim 1 in which $R_1$ is the methyl radical and $R_2$ is the ethyl radical.

4. The compound of claim 1 in which $R_1$ and $R_2$ are methyl radicals.

5. The compound of claim 1 in which $R_1$ is the ethyl radical and $R_2$ is the methyl radical.

* * * * *